United States Patent
Platto et al.

(10) Patent No.: US 7,641,266 B2
(45) Date of Patent: Jan. 5, 2010

(54) CENTRAL PILLAR AND DUCTING FOR AUTOMOTIVE VEHICLE

(75) Inventors: Gordon Platto, Troy, MI (US); Rafael Rego, Salvador (BR); Joann Jung, Ferndale, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 20 days.

(21) Appl. No.: 11/972,929

(22) Filed: Jan. 11, 2008

(65) Prior Publication Data

US 2009/0179457 A1 Jul. 16, 2009

(51) Int. Cl.
*B60J 9/04* (2006.01)
*B62D 27/00* (2006.01)

(52) U.S. Cl. .......... 296/193.06; 296/208; 296/24.4; 296/24.34

(58) Field of Classification Search .......... 296/37.8, 296/24.34, 68.1, 187.01, 193.06, 203.01, 296/208, 24.4; 454/69, 143, 144
See application file for complete search history.

(56) References Cited

U.S. PATENT DOCUMENTS

| | | | | |
|---|---|---|---|---|
| 3,762,505 A | * | 10/1973 | Morse | 188/371 |
| 3,885,810 A | * | 5/1975 | Chika | 280/748 |
| 4,747,636 A | * | 5/1988 | Harasaki et al. | 296/181.4 |
| 6,152,522 A | * | 11/2000 | Boulay et al. | 296/208 |
| 6,786,545 B2 | * | 9/2004 | Bargheer et al. | 297/217.1 |
| 7,096,683 B2 | | 8/2006 | Smith | |
| 2008/0030050 A1 | | 2/2008 | Chen et al. | |

FOREIGN PATENT DOCUMENTS

WO  WO03/057524  *  7/2003

* cited by examiner

*Primary Examiner*—Dennis H Pedder
*Assistant Examiner*—Pinel E Romain
(74) *Attorney, Agent, or Firm*—Frank A. MacKenzie; Brooks Kushman P.C.

(57) ABSTRACT

An automotive vehicle is provided having a vehicle body with a passenger compartment between a vehicle floor, a vehicle roof and side pillars. A pair of passenger seats are oriented within the passenger compartment with a center console mounted therebetween. A central structural pillar extends from the center console to the vehicle roof for supporting a central region of the vehicle roof. A ducting assembly is provided with a central duct extending upward from the center console adjacent to the pair of passenger seats and in fluid communication with a heating and cooling system. An outlet port is provided on the central duct for directing the air to the seating row.

19 Claims, 5 Drawing Sheets

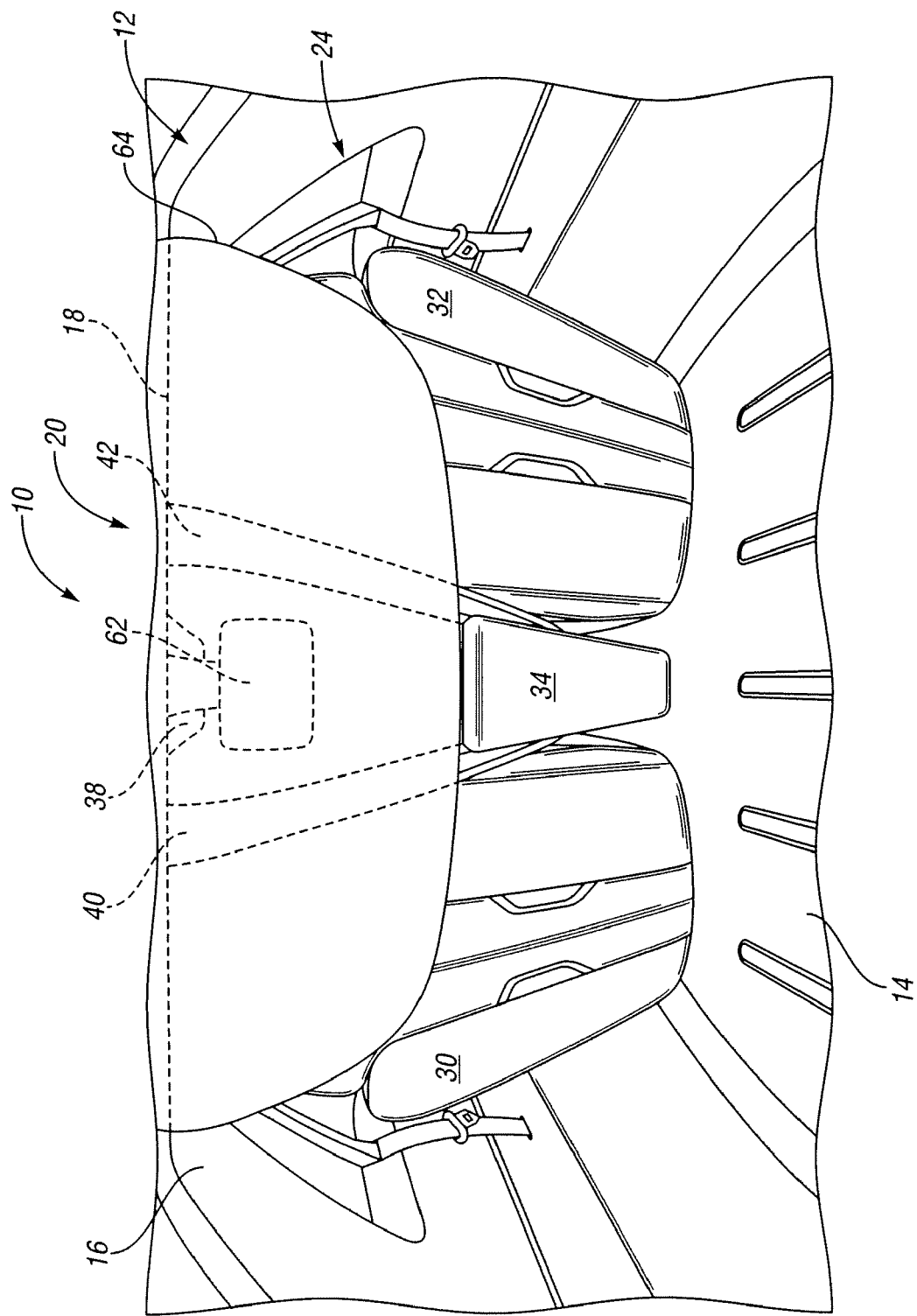

CENTRAL PILLAR AND DUCTING FOR AUTOMOTIVE VEHICLE

BACKGROUND OF THE INVENTION

1. Field of the Invention

The invention relates to structural pillars for automotive vehicles, and ventilation ducting for automotive vehicle passenger compartments.

2. Background Art

The prior art has offered various vehicle pillar structures for supporting the roof of a vehicle. These structures include various structural pillars extending from a ridge line of the vehicle. These structures are enhanced by the quantity of pillars, the strength of the pillars, and various structural additions, such as structural foam within the pillars. Some of the design criteria for these structures include support of the roof during a roof crush scenario, such as a rollover. Such design concerns come into play for vehicles having relatively higher centers of gravity, such as sport utility vehicles (SUVs), trucks, vans, minivans, and crossover vehicles.

Continual efforts have been made to improve the comfort of passengers within an automotive vehicle. Such enhanced comfort features include ventilation to rear seated occupants. Some prior art offerings have included ducting through a center console in the front row with vents facing a rear seating row. Such vents are typically located on a rearside of the center console.

The prior art has also provided other comfort features to automotive vehicle passengers, such as media display screens, foot rests and the like.

SUMMARY OF THE INVENTION

An embodiment of the present invention discloses a passenger vehicle having a vehicle body with a vehicle floor, a plurality of pillars extending from the floor at both lateral sides of the vehicle body, and a roof supported upon the plurality of side pillars. A passenger compartment is provided between the vehicle floor and the vehicle roof, and within the plurality of side pillars. A pair of laterally spaced apart passenger seats are oriented within the passenger compartment. A center console is mounted to the vehicle floor between the pair of passenger seats. A central structural pillar extends from the center console to the vehicle roof for supporting a central region of the vehicle roof.

A further embodiment of the present invention discloses a system for heating and cooling the passenger compartment by conveying heated or cooled air. Ducting is disposed in the central structural pillar in fluid communication with the heating and cooling system for receiving the heated or cooled air. An outlet port is provided in the central structural pillar for directing the heated or cooled air from the ducting to the seats.

A further embodiment provides a pair of central structural pillars.

An even further embodiment discloses the pair of central structural pillars each oriented laterally outboard of the center console.

A further embodiment discloses at least a portion of the central structural pillar oriented generally between the pair of seats.

Another further embodiment discloses that each of the pair of seats includes a seat back and the central structural pillar is displaced generally rearward of the seat backs.

A further embodiment discloses a first seating row oriented within the passenger compartment and a second seating row oriented within the passenger compartment, rearward of the first seating row.

A further embodiment discloses that the first seating row includes a pair of laterally spaced apart passenger seats and the second seating row includes a pair of laterally spaced apart passenger seats.

An even further embodiment discloses that the center console extends between the pair of seats of the first seating row and the pair of seats of the second seating row.

A further embodiment discloses that the central structural pillar is oriented adjacent to the second seating row.

An even further embodiment discloses the heating and cooling system, and ducting with the outlet port directed to the second seating row.

A further embodiment discloses a deployable foot rest oriented beneath a seat in the front seating row with a deployed position extending towards the second seating row for supporting the feet of a second row occupant. The foot rest also has a retracted position beneath the front seating row.

A further embodiment discloses a deployable calf rest oriented beneath a seat in the second seating row having a deployed position extending towards the first seating row for supporting the calf of a second row passenger, and a retracted position beneath the second seating row.

An even further embodiment discloses a roof console mounted to the roof within the passenger compartment and spaced above the center console.

A further embodiment discloses that the center structural pillar extends from the center console to the roof console.

Another further embodiment discloses a deployable display mounted to the roof console with a collapsed position along the roof console and a deployed position wherein the display faces the second seating row.

Another further embodiment discloses a retractable privacy curtain mounted to the roof console rearward of the second seating row to provide an obstacle between the display and a viewer that is rearward of the second seating row.

Another embodiment of the present invention discloses a ducting assembly for an automotive vehicle having a center console adapted to be mounted to a vehicle floor between a pair of passenger seats. A central duct extends upward from the center console adjacent to a pair of passenger seats to engage a vehicle roof. The central duct is adapted to be in fluid communication with a heating and cooling system for receiving heated or cooled air. An outlet port is provided in the central duct for directing the heated and cooled air from the duct to a seating row.

A further embodiment discloses an automotive vehicle having a vehicle body with a vehicle floor, a plurality of pillars extending from the vehicle floor at both lateral sides of the vehicle body, and a vehicle roof supported upon the plurality of side pillars. A passenger compartment is provided between the vehicle floor and the vehicle roof, and within the plurality of side pillars. A first seating row is oriented within the passenger compartment and has a pair of laterally spaced apart passenger seats. A second seating row is also oriented within the passenger compartment rearward of the first seating row, and has a pair of laterally spaced apart passenger seats. A system for heating and cooling the passenger compartment is provided in the passenger vehicle for conveying heated or cooled air. The ducting system is oriented within the passenger compartment and the center console extends between the pair of first row passenger seats and the pair of second row passenger seats. The central duct is oriented adjacent to the second seating row for heating and cooling the second seating row.

Yet another embodiment according to the present invention discloses an automotive vehicle having a vehicle body with a vehicle floor, a plurality of pillars extending from the vehicle floor at both lateral sides of the vehicle body, and a vehicle roof supported upon the plurality of side pillars. A passenger compartment is provided between the vehicle floor and the vehicle roof, and within the plurality of side pillars. A first seating row is oriented within the passenger compartment, having a pair of laterally spaced apart passenger seats. A second seating row is oriented within the passenger compartment rearward of the first seating row, and having a pair of laterally spaced apart passenger seats. A center console is mounted to the vehicle floor and extends between the pair of first row passenger seats and the pair of second row passenger seats. A central structural pillar extends from the center console adjacent to the second seating row, to the vehicle roof for supporting a central region of the vehicle roof. A system for heating and cooling the passenger compartment is provided for conveying heated or cooled air. Ducting is disposed within the central structural pillar in fluid communication with the heating and cooling system for receiving the heated and cooled air. An outlet port is provided in the central pillar for directing the heated and cooled air from the ducting to the pair of second row seats.

The above embodiments, and other embodiments, features, benefits and advantages of the present invention are readily apparent from the attached figures, and from the detailed description of embodiments of the invention set forth below.

BRIEF DESCRIPTION OF THE DRAWINGS

FIG. 5 is another rear perspective view of the passenger compartment of FIG. 1, illustrating a privacy curtain in a deployed position.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
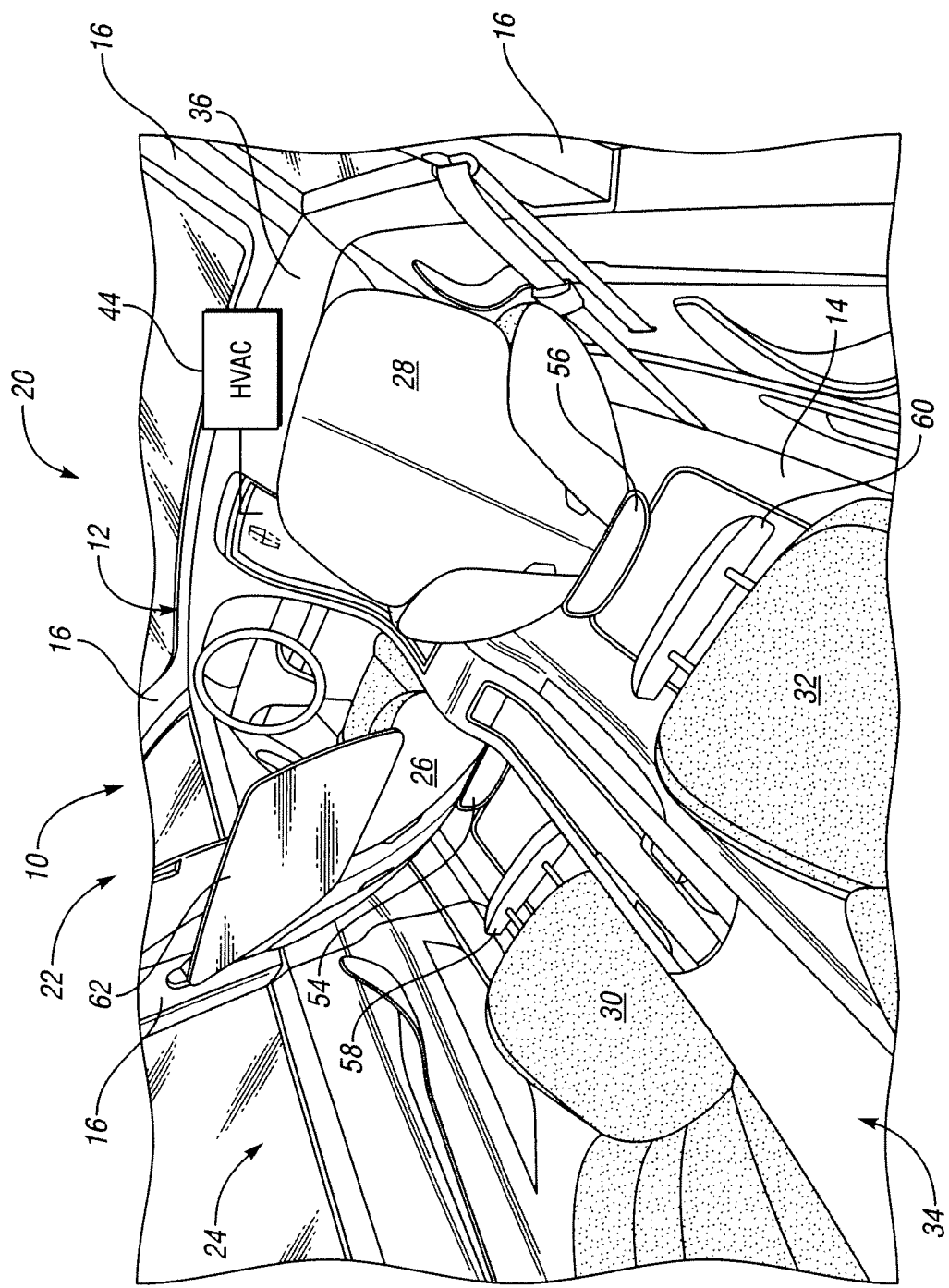
FIG. 1 is a top perspective view illustrating a passenger compartment of an automotive vehicle according to the present invention.
Figure 2:
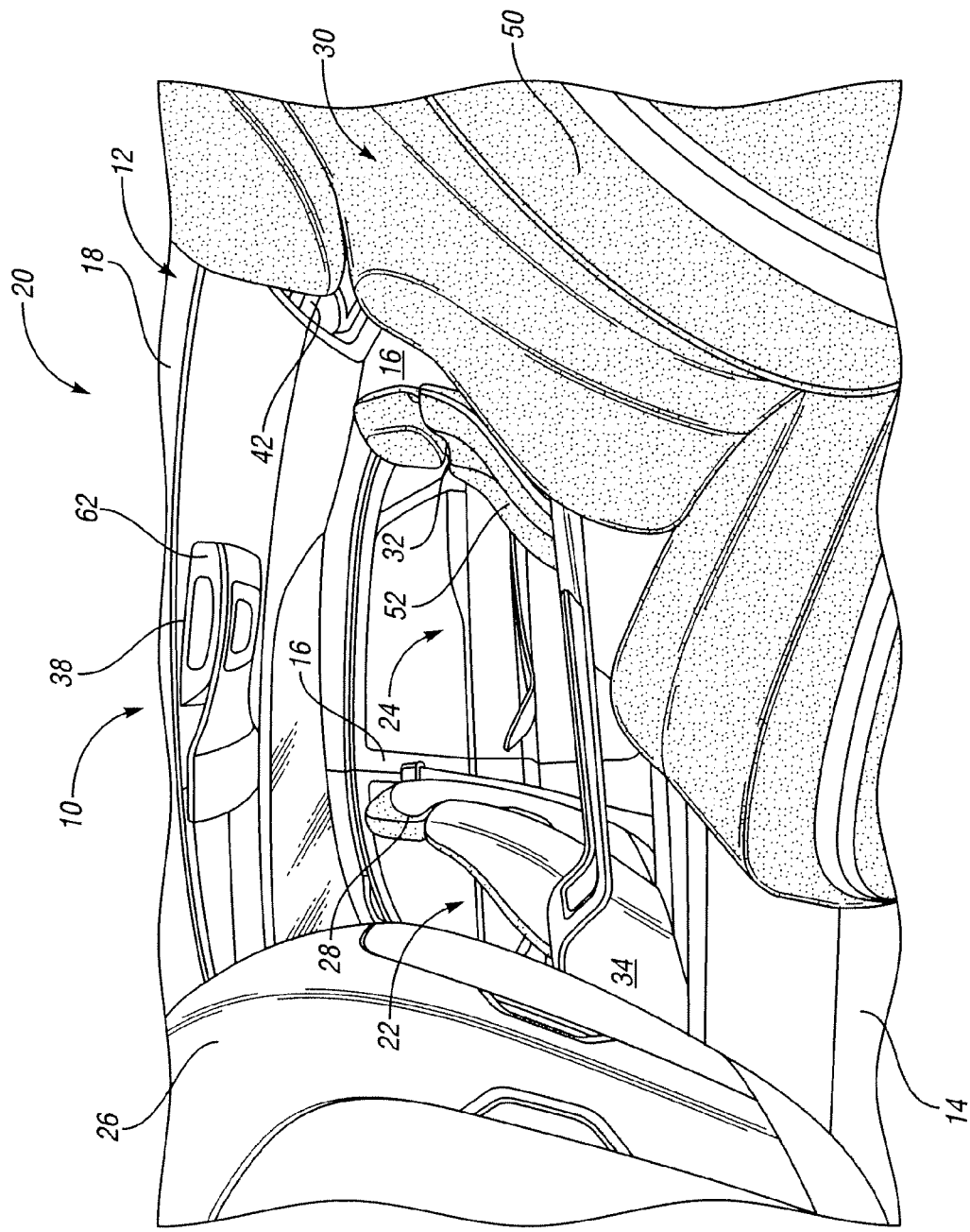
FIG. 2 is a side perspective view of a second seating row of the passenger compartment of FIG. 1.

Referring now to FIGS. 1 and 2, an automotive vehicle is illustrated from an interior environment and is referenced generally by numeral 10. The vehicle 10 has a vehicle body 12, which includes a floor 14 with a plurality of pillars 16 extending from the floor 14 at both lateral sides of the vehicle body 12. A vehicle roof 18 is supported upon the plurality of side pillars 16. A passenger compartment 20 is provided within the vehicle body 12 between the floor 14 and roof 18, and is bounded on both lateral sides by the side pillars 16.

The vehicle 10 is depicted as having two rows of passenger seats, namely a first seating row 22 and a second seating row 24 that is oriented rearward of the first seating row 22. Of course, the invention contemplates any number of seating rows, such as one seating row, or three or more seating rows, within the spirit and scope of the present invention.

In one embodiment, the first seating row 22 and the second seating row 24 each include a pair of laterally spaced apart passenger seats, which are referenced as driver seat 26, front row passenger seat 28, second row driver side seat 30, and second row passenger side seat 32. Of course, any number of seats and any number of seating rows are contemplated within the spirit and scope of the present invention.

The passenger compartment 20 includes a center console 34, which begins at an instrument panel 36 of the passenger compartment 20 and extends between the seats 26, 28 of the first seating row 22, and between the seats 30, 32 of the second seating row 24.

Figure 3:
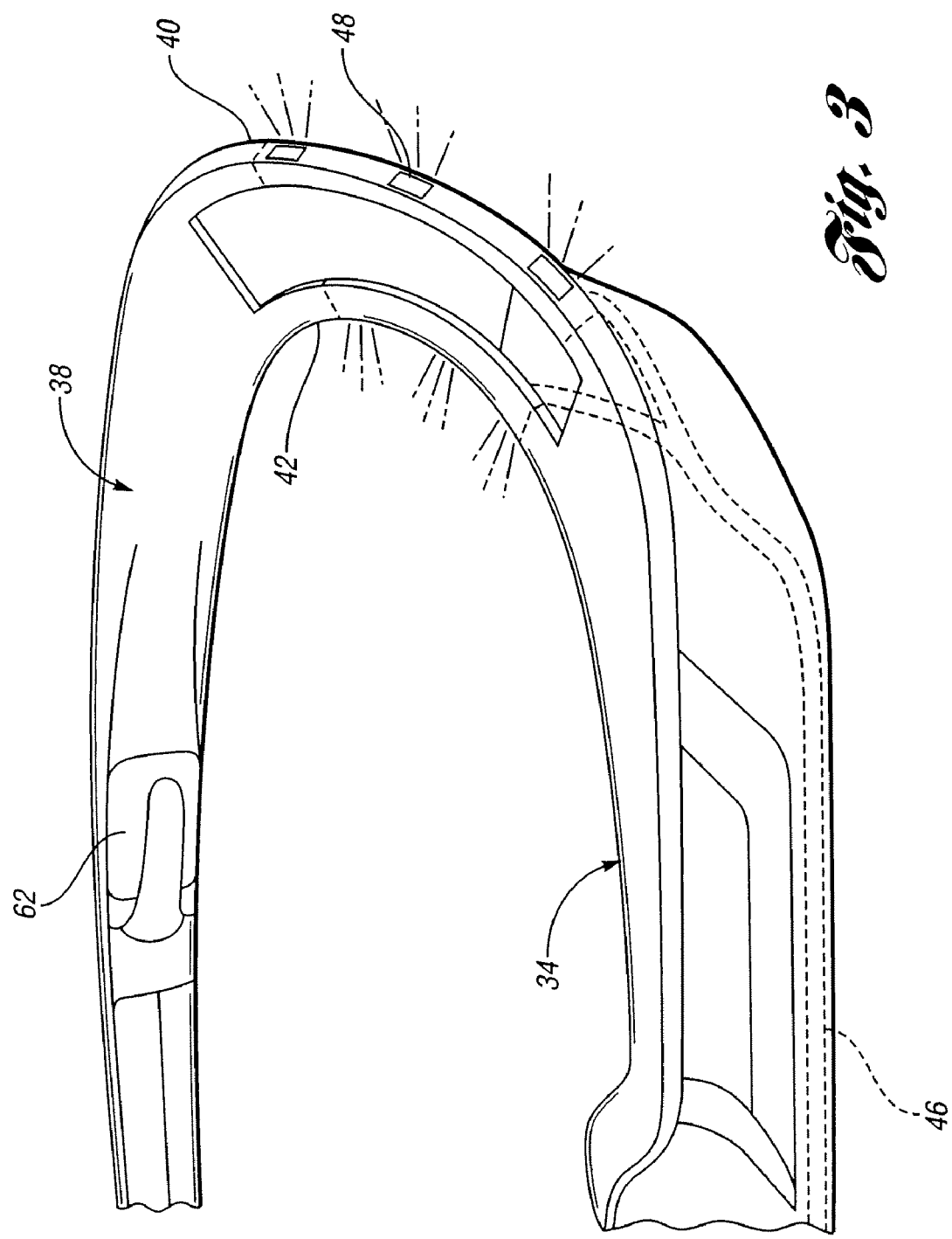
FIG. 3 is a side perspective view of a ducting assembly of the passenger compartment of FIG. 1.

Referring now to FIG. 3, the rear end of the center console 34 is illustrated with the second seating row 24 removed. A roof console 38 is provided on a central region of the vehicle roof 18 spaced apart from the center console 34. A pair of central structural pillars 40, 42 are provided extending from the center console 34 to the roof console 38. Although a pair of central pillars 40, 42 are illustrated and described, the invention contemplates any number of central pillars, such as one central pillar. By providing a pair of central pillars 40, 42, a central blind spot is minimized and a viewing window is provided therebetween for the driver when utilizing a rear-view mirror.

The central pillars 40, 42 provide support to the central region of the vehicle roof 18. The central pillars 40, 42 are formed of a structural material as is common with the side pillars 16, such as stamped metal. The central pillars 40, 42 may also be formed from a structural polymer, or the like. Since the central pillars 40, 42 are provided within the passenger compartment 20, the central pillars 40, 42 are clad with interior trim, such as a foamed trim cover or a copolymer plastic cover, such as acrylonitrile-butadiene-styrene (ABS), or a combination of a copolymer and foam. By providing the central pillars 40, 42 within the passenger compartment 20, additional structural support is provided to the vehicle roof 18 in comparison to prior art structures. Additionally, by providing the central structural support, the vehicle roof 18 is structurally enhanced for roof crush scenarios in comparison to prior art designs.

A drawback to prior art ventilation systems for rear occupants is that the ventilation is typically indirect to the rear seated occupants or limited to one elevation. For example, by providing vents on a rear side of a first row center console, the vents for the rear occupants are generally located at a fixed elevation, which is typically adjacent to the seat bottom. An additional benefit to the central pillars 40, 42 is that ventilation to rear seated occupants is enhanced in comparison to prior art designs.

Referring again to FIG. 1, the vehicle 10 includes a heating, ventilation, and air conditioning (HVAC) system 44 as is known in the art for conveying heated or cooled air to the passenger compartment 20. The HVAC system 44 is controlled by climate controls that are provided on the center console 34 and/or the instrument panel 36.

Referring again to FIG. 3, ducting 46 is provided in the center console 34 in fluid communication with the HVAC system 44 for receiving the forced air that is heated or cooled as controlled by the climate control settings. The ducting 46 is routed through the center console 34 to the central pillars 40, 42. The ducting 46 may be provided to an internal hollow portion of the central pillars 40, 42, which is capped on either end, as illustrated in FIG. 3. Alternatively, the ducting 46 may also be routed within the central pillars 40, 42. A plurality of vents 48 are provided on each of the central pillars 40, 42 adjacent the corresponding second row seat 30, 32 for providing direct ventilation to the rear seated occupants. Thus, the center console 34 and the central pillars 40, 42 provide a ducting assembly for conveying ventilation to the rear seated occupants that is not limited in elevation thereby effectively venting the second row seats at multiple elevations similar to that provided to first row seats.

Figure 4:
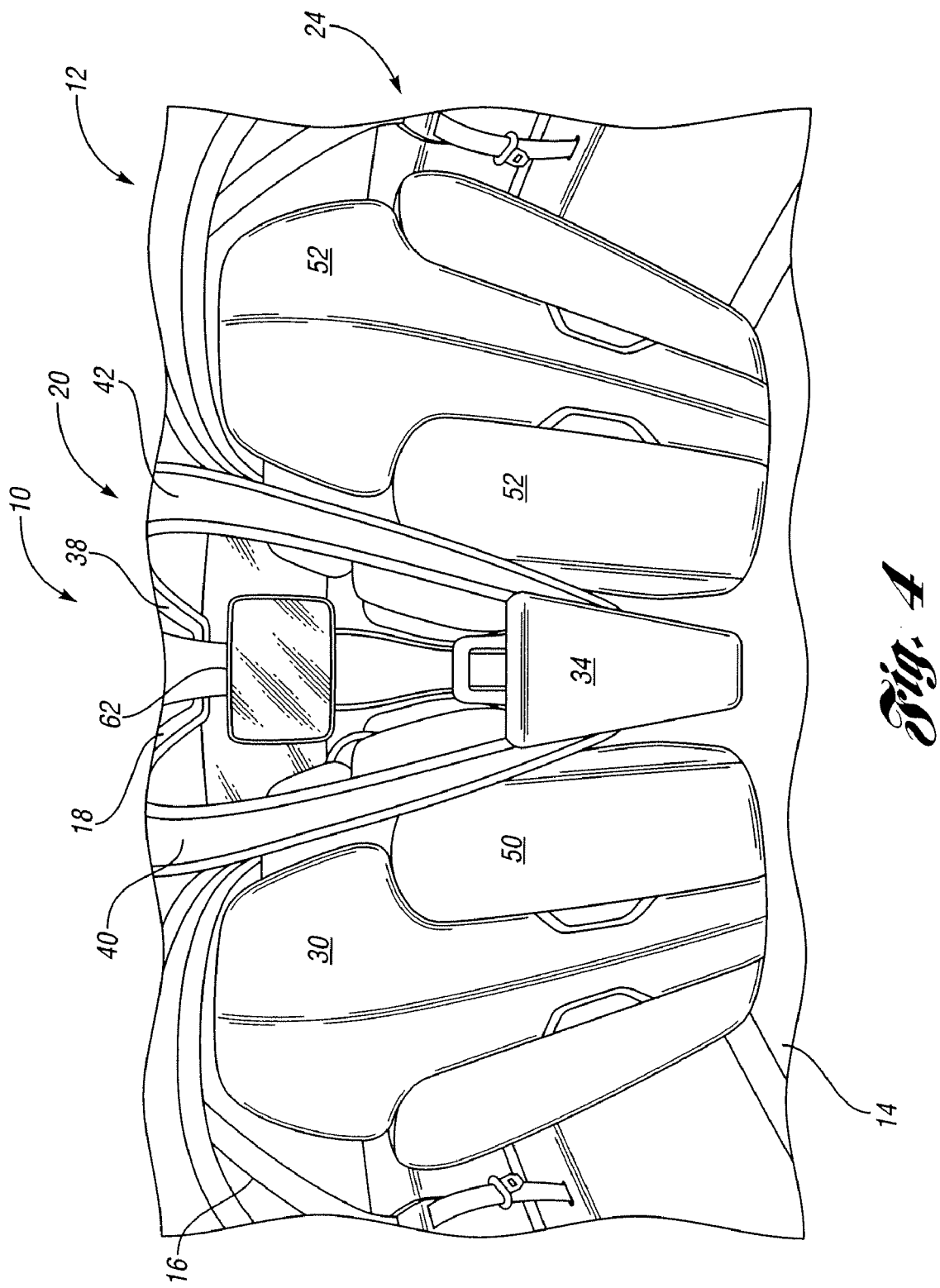
FIG. 4 is a rear perspective view of the passenger compartment of FIG. 1.

Referring now to FIGS. 2-4, the central pillars 40, 42 are oriented laterally outboard of the center console 34 so that the rear seated occupants may utilize the center console 34 as an armrest and for storage. A lower end of the central pillars 40, 42 extends from the center console 34 between the second row seats 30, 32 and curves rearward of seat backs 50, 52 of the rear seats 30, 32 to avoid obstructing the second seating row 24. The curvature of the central pillars 40, 42 still maintains the central pillars 40, 42 generally aligned and adjacent with the seat backs 50, 52 of the rear seats 30, 32 to convey direct ventilation to the occupants of the rear seating row 24.

Referring again to FIGS. 1 and 2, a pair of deployable foot rests 54, 56 are each provided beneath one of the first row seats 22, 24. The foot rest 54, 56 enhance the comfort of the occupants of the second seating row. The foot rest 54, 56 are retractable and have a retracted position beneath the front row seats 22, 24 as illustrated by their absence in FIG. 2. The deployable foot rests 54, 56 may be manually retracted and deployed, or may be translated by an actuator that is controlled by the occupant. To further enhance the comfort of the rear seated occupants, a pair of deployable calf rests 58, 60 are each provided beneath one of the second row seats 30, 32 and extend towards the first row seats 28, 30. The calf rests 58, 60 are illustrated in a deployed position in FIG. 1 and a retracted position, by their absence, in FIG. 2. Similar to the foot rests 54, 56, the calf rests 58, 60 may be manually actuated, or may be driven by an actuator that is controlled by the occupant.

A liquid crystal display (LCD) screen 62 is provided within the passenger compartment 22 to provide entertainment to rear seated occupants. The LCD screen 62 is illustrated in FIGS. 1-4. The LCD screen 62 is deployable from the roof console 38 and is illustrated in the deployed position in FIGS. 1 and 4, and in a collapsed position against the roof console 38 in FIGS. 2 and 3. The LCD screen 62 is a multimedia display for entertaining rear occupants with videos, games, information, or the like.

In the advent of utilizing media display screens within passenger compartments, the display commonly can be viewed by external viewers, such as people external of the vehicle, or occupants in other vehicles. Such external viewing limits the privacy of the occupants viewing the display, and may be distracting to other drivers. In order to enhance privacy and minimize distraction of other drivers, a retractable privacy curtain 64 is mounted to the vehicle roof 18 and is illustrated deployed in FIG. 5. The privacy screen 64 provides an obstacle to the screen 62 and viewers that are rearward of the second seating row 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive vehicle comprising:
   a vehicle body having a vehicle floor, a plurality of pillars extending from the vehicle floor at both lateral sides of the vehicle body, a vehicle roof supported upon the plurality of side pillars, and a passenger compartment provided between the vehicle floor and the vehicle roof, and within the plurality of side pillars;
   at least a pair of laterally spaced apart passenger seats oriented within the passenger compartment and mounted to the vehicle floor;
   a center console mounted to the vehicle floor between the at least a pair of passenger seats; and
   a pair of central structural pillars extending from the center console to the vehicle roof for supporting a central region of the vehicle roof.

2. The automotive vehicle of claim 1 further comprising:
   a system for heating and cooling the passenger compartment by conveying heated or cooled air;
   ducting disposed in the pair of central structural pillars in fluid communication with the heating and cooling system for receiving the heated or cooled air; and
   at least one outlet port provided in the pair of central structural pillars for directing the heated or cooled air from the ducting to the at least a pair of seats.

3. The automotive vehicle of claim 1 wherein the pair of central structural pillars further to provides clearance for a viewing window therebetween.

4. The automotive vehicle of claim 3 wherein the pair of central structural pillars are each oriented laterally outboard of the center console to further provide clearance for a viewing window therebetween.

5. The automotive vehicle of claim 1 wherein at least a portion of the pair of central structural pillars is oriented generally between the at least a pair of seats.

6. The automotive vehicle of claim 1 wherein each of the at least a pair of seats includes a seat back and the pair of central structural pillars is generally displaced rearward of the seat backs.

7. The automotive vehicle of claim 1 wherein the at least a pair of passenger seats further comprises:
   a first seating row oriented within the passenger compartment; and
   a second seating row oriented within the passenger compartment rearward of the first seating row.

8. The automotive vehicle of claim 7 wherein the first seating row includes a pair of laterally spaced apart passenger seats and the second seating row includes a pair of laterally spaced apart passenger seats.

9. The automotive vehicle of claim 8 wherein the center console extends between the pair of seats of the first seating row and the pair of seats of the second seating row.

10. The automotive vehicle of claim 7 wherein the pair of central structural pillars is oriented adjacent to the second seating row.

11. The automotive vehicle of claim 10 further comprising:
    a system for heating and cooling the passenger compartment by conveying heated or cooled air;
    ducting disposed in the pair of central structural pillars in fluid communication with the heating and cooling system for receiving the heat or cooled air; and
    at least one outlet port provided in the pair of central structural pillars for directing the heated or cooled air from the ducting to the second seating row.

12. The automotive vehicle of claim 7 further comprising at least one deployable foot rest oriented beneath a seat in the front seating row, the foot rest having a deployed position extending towards the second seating row for supporting at least one foot of a second row seated passenger, and a retracted position beneath the front seating row.

13. The automotive vehicle of claim 12 further comprising at least one deployable calf rest oriented beneath a seat in the second seating row behind the foot rest, the calf rest having a deployed position extending towards the first seating row for supporting at least one calf of the second row seated passenger, and a retracted position beneath the second seating row.

14. The automotive vehicle of claim 7 further comprising a roof console mounted to the roof within the passenger compartment spaced above the center console.

15. The automotive vehicle of claim 14 wherein the pair central of structural pillars extends from the center console to the roof console.

16. The automotive vehicle of claim 14 further comprising a deployable display mounted to the roof console having a collapsed position along the roof console and a deployed position wherein the display faces the second seating row.

17. The automotive vehicle of claim 16 further comprising a retractable privacy curtain mounted to the roof console rearward of the second seating row to provide an obstacle between the display and a viewer rearward of the second seating row.

18. An automotive vehicle comprising:
a vehicle body having a vehicle floor, a plurality of pillars extending from the vehicle floor at both lateral sides of the vehicle body, a vehicle roof supported upon the plurality of side pillars, and a passenger compartment provided between the vehicle floor and the vehicle roof, and within the plurality of side pillars;
a first seating row oriented within the passenger compartment, having a pair of laterally spaced apart passenger seats mounted to the vehicle floor;
a second seating row oriented within the passenger compartment rearward of the first seating row, having a pair of laterally spaced apart passenger seats mounted to the vehicle floor;
a center console mounted to the vehicle floor extending between the pair of first row passenger seats and the pair of second row passenger seats;
a pair of central structural pillars extending from the center console adjacent to the second seating row, to the vehicle roof for supporting a central region of the vehicle roof,
a system for heating and cooling the passenger compartment by conveying heated or cooled air;
ducting disposed in the central structural pillar in fluid communication with the heating and cooling system for receiving the heated or cooled air; and
at least one outlet port provided in a pair of central structural pillars for directing the heated or cooled air from the ducting to the pair of second row seats.

19. An automotive vehicle comprising:
a vehicle body having a vehicle floor, a plurality of pillars extending from the vehicle floor at both lateral sides of the vehicle body, a vehicle roof supported upon the plurality of side pillars, and a passenger compartment provided between the vehicle floor and the vehicle roof, and within the plurality of side pillars;
at least a pair of laterally spaced apart passenger seats oriented within the passenger compartment;
a center console mounted to the vehicle floor between the at least a pair of passenger seats; and
a pair of central structural pillars extending from the center console to the vehicle roof for supporting a central region of the vehicle roof, wherein the central pillars provide clearance for a viewing window therebetween.

* * * * *